United States Patent [19]

Reed et al.

[11] Patent Number: 5,110,785

[45] Date of Patent: May 5, 1992

[54] COMPOSITION OF MATTER AND METHOD OF MAKING

[76] Inventors: Thomas B. Reed, 1810 Smith Rd., Golden, Colo. 80401; William L. Mobeck, 3331 S. Monaco Pkwy., #B, Denver, Colo. 80222

[21] Appl. No.: 694,355

[22] Filed: May 1, 1991

[51] Int. Cl.$^5$ .............................................. B01J 20/24
[52] U.S. Cl. ...................................... 502/404; 502/418
[58] Field of Search .............................. 502/404, 418

[56] References Cited

U.S. PATENT DOCUMENTS

| | | | |
|---|---|---|---|
| 3,950,143 | 4/1976 | Pyle | 44/1 C |
| 4,343,680 | 8/1982 | Field et al. | 210/691 |
| 4,553,978 | 11/1985 | Yvan | 44/1 E |
| 4,605,640 | 8/1986 | Fanta et al. | 502/402 |
| 4,753,917 | 6/1988 | Grenthe | 502/404 |
| 4,770,715 | 9/1988 | Mandel et al. | 134/40 |
| 4,784,773 | 11/1988 | Sandberg | 210/691 |
| 4,925,343 | 5/1990 | Raible et al. | 405/60 |

OTHER PUBLICATIONS

Schatzberg, Paul and Nagy, K. V., Sorbents for Oil Spill Removal, pp. 221-233.

*Primary Examiner*—Patrick P. Garvin
*Assistant Examiner*—Brent M. Peebles
*Attorney, Agent, or Firm*—Fields, Lewis, Pittenger & Rost

[57] ABSTRACT

Disclosed herein is a novel composition of matter which is prepared by subjecting at least one woodlike particle, such as a sawdust particle and preferably selected quantities of sawdust particles to a special treatment. Each particle has a cellular structure including a plurality of interconnected, generally tubular cell walls composed in part of hemicellulose that are subjected to a selectively controlled thermolytic heating above about 280° C. but not above about 380° C. and preferably between 300+ C. and 360° C. to cause the hemicellulose to be converted to an oil-like oleophilic and hydrophobic substance on the cell walls and reduce the thickness of the cell walls to render the particle and particles oleophilic and hydrophobic. The product floats on water, absorbs oil, for absorbing hydrocarbons on the surface of water, and is an improved fuel both without and with the hydrocarbons.

15 Claims, 3 Drawing Sheets

COMPOSITION OF MATTER AND METHOD OF MAKING

TECHNICAL FIELD

This invention relates to a novel composition of matter that is particularly suitable for floating on water for extended periods of time and for absorbing oil, hydrocarbons and like oil-like substances from the surface of water, can be used as a fuel and to a method for its manufacture.

BACKGROUND ART

A number of attempts have been made to treat selected materials so as to render them oleophilic and hydrophobic. These methods include coating a material with silicone, with vegetable oils, etc. Charcoal has also been proposed as an absorbent but charcoal is hydrophilic and sinks in water.

In general the sorbent materials provided by the prior art are all relatively expensive. Some of the recent U.S. Pat. describing different types of sorbent materials are Fanta et al. No. 4,605,640, Mandel No. 4,770,715, Sandberg No. 4,787,773 and Raible No. 4,925,343.

In addition, Grenthe No. 4,753,917 discloses the subjecting of fibers of cellulosic material to rapid forced heating to expand the fibers to form a sorbent material.

Pyle No. 3,950,143 discloses the forming of a fuel from woody material by pyrolysis type toasting of woody material at temperatures above 380° C.

Yvan No. 4,553,978 discloses forming a torrefied biomass by heating biomass to a temperature between 200° C. and 280°C.

A publication entitled SORBENTS FOR OIL SPILL REMOVAL by Paul Schatzberg discusses the properties of various materials that have been used as sorbents.

DISCLOSURE OF THE INVENTION

A composition of matter wherein a woodlike particle and preferably a selected quantity of particles each having a cellular structure including hemicellulose is treated within a selected temperature range and for a sufficient time to convert at least a portion of the hemicellulose to an oil-like oleophilic, hydrophobic substance. The substance collects on the internal and external surfaces of the cell structure rendering the resulting cell structure oleophilic and hydrophobic. Dry pine sawdust heated to temperatures between 280°C. and 380° C. and preferably between 300°C. and 360°C. has been found particularly suitable for providing this composition of matter.

BRIEF DESCRIPTION OF DRAWINGS

Details of this invention are described in connection with the accompanying drawings which like parts bear similar reference numerals in which.

DETAILED DESCRIPTION

Figure 1:
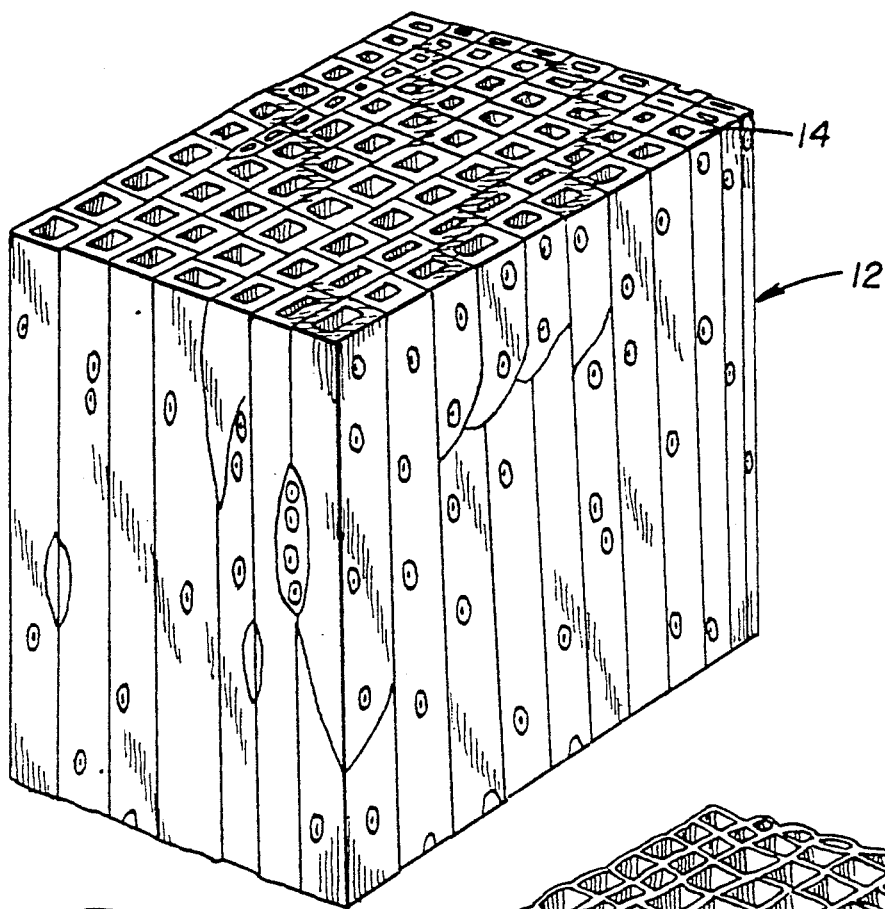
FIG. 1 is a perspective view of a representation of wood such as may be found in a particle of soft pine sawdust prior to treatment.

Biomass is a generic term frequently applied to natural organic materials. Wood is one of the most common forms of biomass. Referring now to FIG. 1, a representative illustration of a particle of wood 12 such as soft pine sawdust is shown to be of oblong form and have a cellular structure including a plurality of adjacent interconnected elongated tubular cell walls 14. These tubular cell walls are made of cellulose coated with layers of hemicellulose and lignin. A typical composition for soft pine would be about 50% cellulose, about 20% hemicellulose and about 30% lignin.

Figure 2:
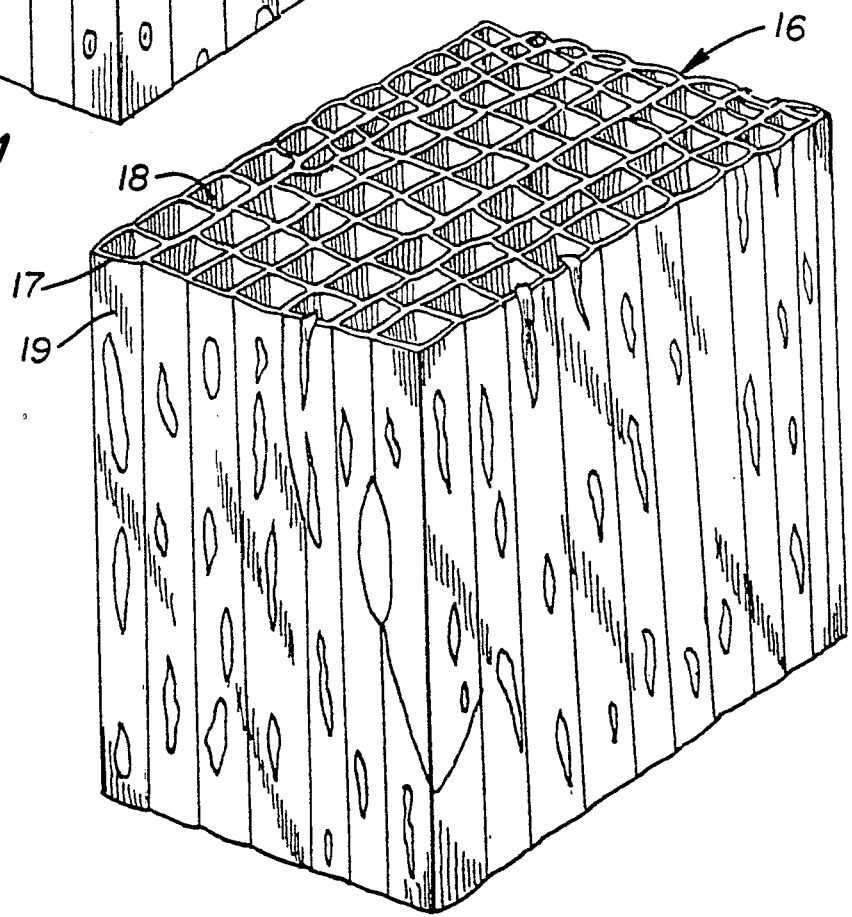
FIG. 2 is a perspective view of a representation of a particle of the resulting product after treatment according to the present invention.

In general, in accordance with the present invention, a selected quantity of biomass, such as soft pine sawdust having a particular size between 10 and 50 mesh, is heated in suitable selective controlled heating means such as a rotary oven at a temperature of between about 280° C. and 380° C., preferably between about 300° C. and 360°C., so that at least a portion of the hemicellulose is substantially converted to an oil-like, oleophilic, hydrophobic substance that remains on the wall surfaces. The controlled selective heating is herein referred to as "thermolysis" meaning controlled heating to produce limited alteration as opposed to pyrolysis heating wherein there is a complete breakdown of the material such as is the case when making charcoal. A particle of resulting product material 16 shown in FIG. 2 retains substantially the same shape but has a greatly reduced weight and the overall thickness of the interconnected elongated tubular cell walls 17 decreases significantly. Further, the cell structure becomes oleophilic and hydrophobic. The product 16 shown has internal pores 18 that will absorb oil like a sponge and external surfaces 19 that will adsorb oil like a mop.

Figure 3:
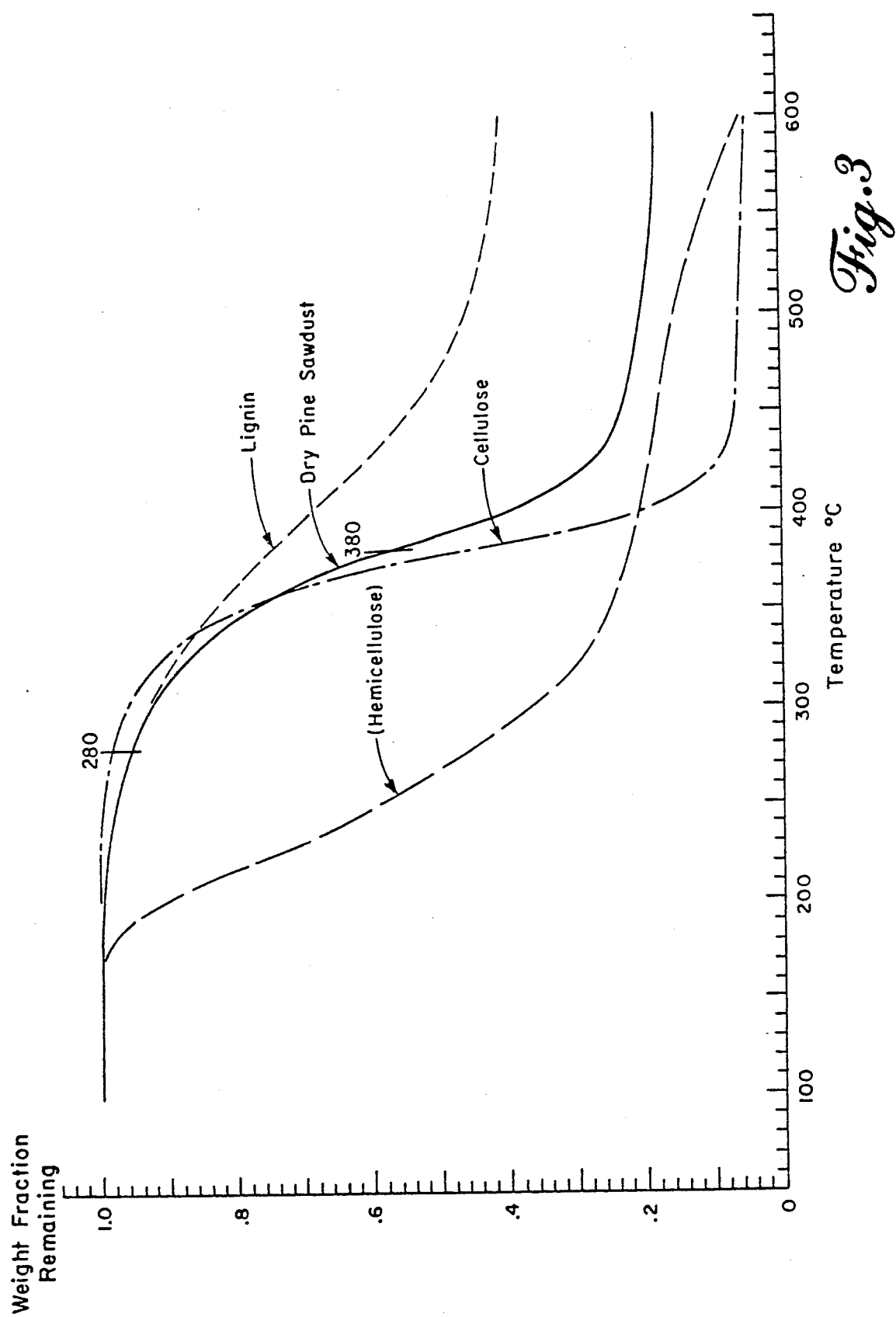
FIG. 3 is a graph illustrating the relationship between weight fraction remaining and temperature for dry pine sawdust, hemicellulose, lignin, and cellulose.

Referring now to FIG. 3, a full line graph shows what happens to a quantity of the dry pine sawdust when subjected to increased temperatures in the selected temperature range with graphs for hemicellulose, cellulose and lignin shown in dashed lines. During heating, the components of hemicellulose, cellulose and lignin in the wood sawdust particles break down and vaporize causing increased weight loss at increased temperatures. The initial wood cell structure breaks down and loses weight and the wood graph is essentially a composite of the three dashed graphs. The dashed graphs show that in the selected temperature range the major portion of the hemicellulose converts to an oil-like, oleophilic, hydrophobic substance. This substance collects on the internal and external surfaces of the cellular structure. Hemicellulose is the least stable of these compounds and decomposes in the temperature range of 200° C. to 350° C. Cellulose decomposes in a narrow temperature range between about 350° C. and 400°C. and lignin decomposes over a broad range of about 300° C. to 600° C. The loss in weight observed is between about 200° C. and 600°C. and this is due to the evaporation of the above substances which produces vapors composed of many hundreds of compounds representing the breakdown products of the cellulose, hemicellulose and lignin.

Several more specific examples of the present invention are as follows:

EXAMPLE 1

Forty grams of dry pine sawdust of between 8-16 mesh were heated in a rotary oven twenty minutes to bring the temperature of the sawdust to about 280° C. and controlled heating was applied by the oven to maintain the 280° C. for about ten minutes. The sawdust was then cooled to 200°C. for about five minutes and then removed and weighed. The weight of the material (resulting product material) was thirty-five grams to provide a dry weight yield of 35/40 or about 88%. The color was brown. To test for the hydrophobic qualities a sample of the resulting product material was shaken with fresh water and 70% of the material floated for at least 12 hours in fresh water and the resulting product material was shaken with salt water 90% floated for at least 12 hours in salt water. To test for oil absorption in fresh water 3.72 grams of oil were floated on the surface of fresh water. 1.49 grams of the resulting product material in fresh water was required to absorb the oil so that the resulting product material floated 250% of its own weight of oil for an extended period beyond twelve hours. The resulting product material had a dry appearance.

EXAMPLE 2

Forty-four grams of dry pine sawdust of between 8-16 mesh were heated in a rotary oven twenty minutes to bring the temperature of the sawdust to about 300° C. and controlled heating was applied by the oven to maintain the 300° C. for about ten minutes. The sawdust was then cooled to 200°C. for about five minutes and then removed and weighed. The weight of the material (resulting product material) was forty grams to provide a dry weight yield of 40/44 or about 91%. The color was dark brown. To test for the hydrophobic qualities a sample of the resulting product material was shaken with fresh water and 80% of the material floated for at least 12 hours in fresh water and the resulting product material was shaken with salt water and 98% floated for at least 12 hours in salt water. To test for oil absorption in fresh water 3.61 grams of oil were floated on the surface of fresh water. 1.98 grams of the resulting product material in fresh water was required to absorb the oil so that the resulting product material floated 182% of its own weight of oil for an extended period beyond twelve hours. The resulting product material had a dry appearance.

EXAMPLE 3

Forty-six grams of dry pine sawdust of between 8-16 mesh were heated in a rotary oven twenty minutes to bring the temperature of the sawdust to about 340°C. and controlled heating was applied by the oven to maintain the 340° C. for about ten minutes. The sawdust was then cooled to 200°C. for about five minutes and then removed and weighed. The weight of the material (resulting product material) was twenty-five grams to provide a dry weight yield of 25/46 or about 54%. The color was very dark brown. To test for the hydrophobic qualities a sample of the resulting product material was shaken with fresh water and 90% of the material floated for at least 12 hours in fresh water and the resulting product material was shaken with salt water and 99% floated for at least 12 hours in salt water. To test for oil absorption in fresh water 2.76 grams of oil were floated on the surface of fresh water. One gram of the resulting product material in fresh water was required to absorb the oil so that the resulting product material floated 276% of its own weight of oil for an extended period beyond twelve hours. The resulting product material after absorbing the oil had a dry appearance.

EXAMPLE 4

Forty-two grams of dry pine sawdust of between 8-16 mesh were heated in a rotary oven twenty minutes to bring the temperature of the sawdust to about 360° C. and controlled heating was applied by the oven to maintain the 360° C. for about ten minutes. The sawdust was then cooled to 200°C. for about five minutes and then removed and weighed. The weight of the material (resulting product material) was seventeen grams to provide a dry weight yield of 17/42 or about 40%. The color was black. To test for the hydrophobic qualities a sample of the resulting product material was shaken with fresh water and 30% of the material floated for at least 12 hours in fresh water and the resulting product material was shaken with salt water and 60% floated for at least 12 hours in salt water. To test for oil absorption in fresh water 3.26 grams of oil were floated on the surface of fresh water. 0.9 grams of the resulting product material in fresh water was required to absorb the oil so that the resulting product material floated 362% of its own weight of oil for an extended period beyond twelve hours. The resulting product material had a dry appearance.

EXAMPLE 5

Forty-two grams of dry pine sawdust of between 8-16 mesh were heated in a rotary oven twenty minutes to bring the temperature of the sawdust to about 380°C. and controlled heating was applied by the oven to maintain the 380° C. for about ten minutes. The sawdust was then cooled to 200°C. for about five minutes and then removed and weighed. The weight of the material (resulting product material) was fifteen grams to provide a dry weight yield of 15/42 or about 36%. The color was black. To test for the hydrophobic qualities a sample of the resulting product material was shaken with fresh water and 20% of the material floated for at least 12 hours in fresh water and the resulting product material was shaken with salt water and 40% floated for at least 12 hours in salt water. To test for oil absorption in fresh water 5.12 grams of oil were floated on the surface of fresh water. 1.69 grams of the resulting product material in fresh water was required to absorb the oil so that the resulting product material floated 300% of its own weight of oil for an extended period beyond twelve hours. The resulting product material had a dry appearance.

Figure 4:
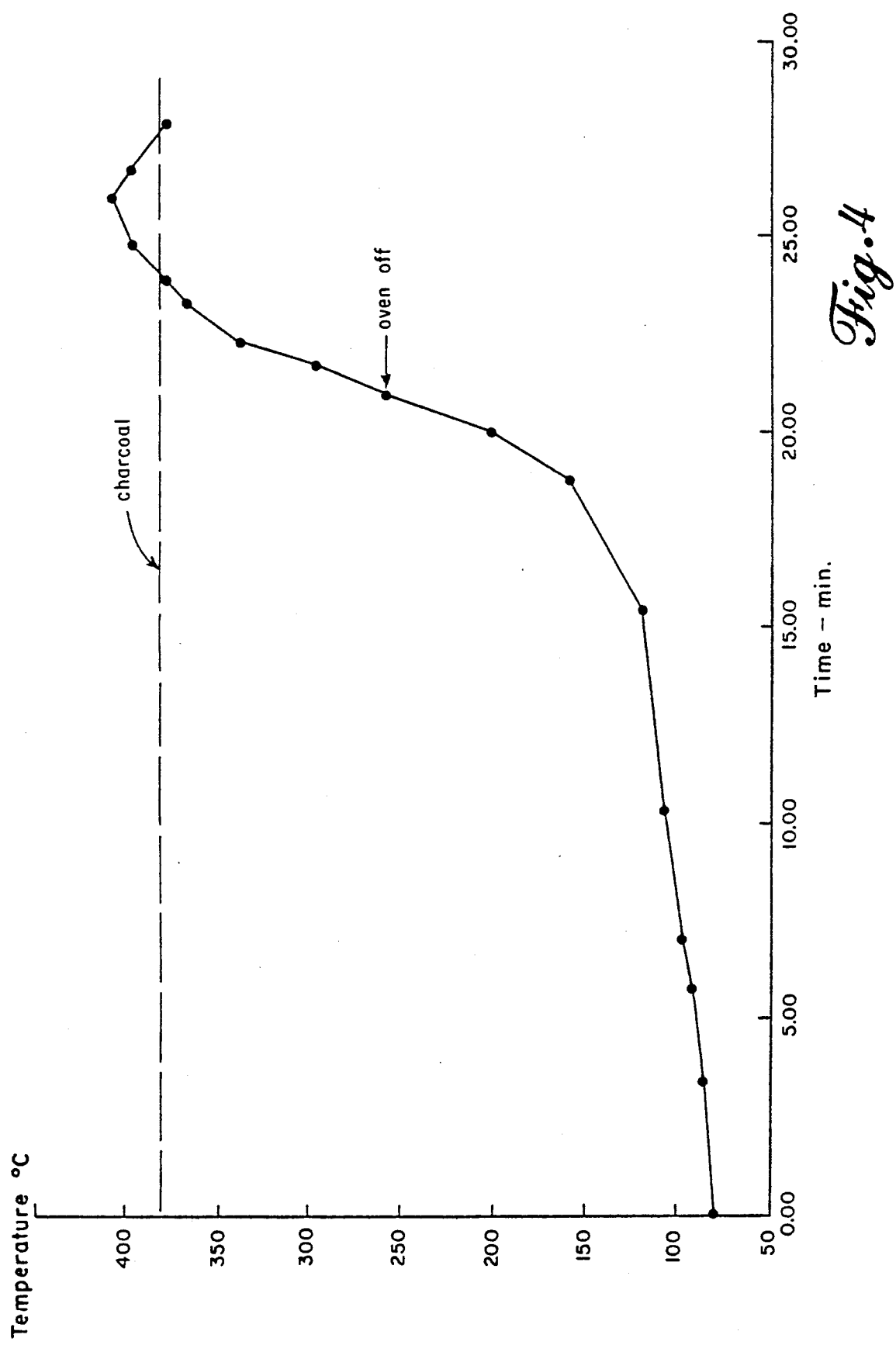
FIG. 4 is a graph illustrating the relationship between time and temperature in a heating process according to the present invention.

Referring now to FIG. 4 in the thermolytic heating cycle of the present invention, it can be seen that after about twenty minutes even when the oven is turned off, the temperature increases to above 400° C. which would be the temperature range in which charcoal is formed. It is well known that in the manufacture of charcoal that an exothermic reaction would provide self-heating of the material in a range above 200° C. Therefore, it is a necessary part of the present invention that heating be controlled to achieve an internal heating temperature of the sawdust up to about 380°C. but not allow it to go above 380°C. Good results are obtained at 330°C. for ten minutes. Other heating apparatus for carrying out the process could include a multiple hearth kiln or modified dryers.

From the foregoing it is clear that the composition of matter of the present invention is easily made from commonly available sawdust with a thermolytic treatment. The product is biodegradable. The product may be placed on water and will float for extended periods of time. The product may act as an adsorbent collecting petroleum liquids primarily on internal surfaces as does a sponge. It has an affinity to multiple weights of petroleum liquids. It will absorb petroleum rapidly. It will remain afloat for an extended period of time before and after absorption and it tends to agglomerate after absorption making easier recovery.

It has been found the product of the present invention is a very effective absorbent for oil in marine spills. The product absorbs approximately 3-6 times its own weight and forms a solid material that is biodegradable. The remaining cellulosic materials and minerals in the biomass provide necessary nutrients for oil eating bacteria.

Once the product has been used to absorb oil, hydrocarbons, or other oil-like substances and removed from the water, the oil, etc. can be recovered in several ways. The oil, etc. can be recovered by roasting at temperatures to 300°C., using vacuum if desired to assist in volatilization. The oil, etc. can be removed from the product structure by solvent extraction. Because the product has been thermally treated, the high strength of the original biomass is diminished, and oil, etc. can be pressed from the mass with a wringer. The oil, etc. can also be centrifuged.

The product without oil, etc. further has an energy content, typically 9,500-11,000 BTU/lb. compared to that of the original sawdust which is typically about 8,000 BTU/lb. The product saturated with oil, etc. has an energy content typically 18,000-21,000 BTU/lb. This product with or without oil, etc. is easily shipped because the product retains its strength and does not crumble like charcoal.

Although the present invention has been described with a certain degree of particularity, it is understood that the present disclosure has been made by way of example and that changes in details of structure may be made without departing from the spirit thereof.

What is claimed is:

1. A composition of matter comprising at least one woodlike particle having a cellular structure of a plurality of adjacent interconnected elongated tubular cell walls composed in part of hemicellulose that have been heated to a controlled selected temperature and for a time sufficient to convert at least a portion of the hemicellulose to an oil-like oleophilic, hydrophobic substance that forms on the internal and external surfaces of the cell walls to substantially reduce the weight of the cell walls and render the particle oleophilic and hydrophobic.

2. A composition of matter as set forth in claim 1 wherein said particle has a size between about 10 and 50 mesh.

3. A composition of matter as set forth in claim 1 wherein said particle is dry pine sawdust having a size between about 8 and 16 mesh.

4. A composition of matter as set forth in claim 1 wherein said heating temperature of said particle is about 330°C. and said time is about ten minutes.

5. A composition of matter as set forth in claim 1 wherein said heating is by a selectively controlled thermolytic heating.

6. A composition of matter as set forth in claim 1 wherein said heating of said particle was at about 330° C. for about ten minutes, and said particle was cooled to about 200° C. for about five minutes.

7. A composition of matter as set forth in claim 1 wherein said particle is a biomass composed primarily of about 50% cellulose, about 20% hemicellulose and about 30% lignin.

8. A composition of matter as set forth in claim 1 wherein said converted particle floats on water for extended periods of time.

9. A composition of matter comprising at least one woodlike particle having a cellular structure of a plurality of adjacent interconnected elongated tubular cell walls defining internal pores and external surfaces composed in part of hemicellulose that have been heated to a temperature of at least about 280°C. but not above about 380° C. for a time sufficient to convert at least a portion of the hemicellulose to an oil-like oleophilic, hydrophobic substance that forms on the internal and external surfaces of the cell walls and reduces the thickness of the walls so that said internal pores will absorb oil and said external surfaces will adsorb oil to render said particle oleophilic and hydrophobic.

10. A dry, biodegradable, oleophilic, sorbent composition of matter useful for floating on water for extended periods of time and absorbing oil without sinking and useful as a fuel comprising:
   a particulate, wood sawdust with each sawdust particle having a cellular structure of a plurality of adjacent interconnected elongated tubular cell walls including hemicellulose, cellulose and lignin that have been heated to a temperature of at least about 280° C. but not above about 380° C. for a time sufficient to convert at least a portion of the hemicellulose to an oil-like oleophilic, hydrophobic substance that forms on the internal and external surfaces of the cell walls to render the particle oleophilic and hydrophobic.

11. A composition of matter derived from a method comprising:
   treating at least one woodlike particle having a cellular structure of a plurality of adjacent interconnected elongated tubular cell walls composed in part of hemicellulose that have been heated to a temperature of at least about 280° C. but not above about 380° C. for a time sufficient to convert at least a portion of the hemicellulose to an oil that forms on the internal and external surfaces of the cell walls to render the particle oleophilic and hydrophobic.

12. A method of converting at least one woodlike particle to a composition of matter comprising:
   heating a woodlike particle having a cellular structure of a plurality of interconnected elongated tubular cell walls composed in part of hemicellulose to a temperature of at least about 280°C. but not above about 380° C. for a time sufficient to convert at least a portion of the hemicellulose to an oil that forms on the internal and external surfaces of the cell walls to render the particle oleophilic and hydrophobic.

13. A method as set forth in claim 12 wherein said time is at least ten minutes and said temperature is between about 300° C. and 360° C.

14. A method as set forth in claim 12 wherein said heating of said particle was at about 330°C. for about ten minutes and the particle was cooled to about 200° C. for about five minutes.

15. A method as set forth in claim 12 wherein said woodlike particle is a selected quantity of dry pine sawdust having a size between about 8 and 16 mesh.

* * * * *